United States Patent [19]

Capdeville

[11] Patent Number: 5,447,428

[45] Date of Patent: Sep. 5, 1995

[54] TABLE LAMP WITH REMOVABLE OIL CONTAINER

[76] Inventor: Martin Capdeville, 4106 Storm Ave., Yakima, Wash. 98908

[21] Appl. No.: 234,404

[22] Filed: Apr. 28, 1994

[51] Int. Cl.⁶ ............................................. F23D 3/24
[52] U.S. Cl. .................................. 431/320; 431/322; 431/324; 431/332; 431/125
[58] Field of Search ............... 431/322, 324, 332, 344, 431/125

[56] References Cited

U.S. PATENT DOCUMENTS

| | | | |
|---|---|---|---|
| 2,376,976 | 5/1945 | Orr | 431/324 X |
| 3,905,754 | 9/1975 | Maddestra et al. | 431/324 |
| 3,994,672 | 11/1976 | Novak | 431/320 |
| 4,608,011 | 8/1986 | Comstock | 431/324 |
| 4,805,076 | 2/1989 | Menter | 431/320 |
| 4,875,852 | 10/1989 | Ferren | 431/324 |
| 5,127,825 | 7/1992 | Tendrick, Sr. | 431/320 |
| 5,205,730 | 4/1993 | Capdexille | 431/320 |

*Primary Examiner*—Larry Jones
*Attorney, Agent, or Firm*—Stratton Ballew

[57] ABSTRACT

An oil-fueled table lamp is disclosed comprising a soft drink can or beer can whose contents have been replaced with lamp oil, a lower can receptacle, a handle, an upper can receptacle having a wick protruding through the approximate center thereof. The upper can receptacle is adjustable to receive cans of differing heights.

3 Claims, 3 Drawing Sheets

TABLE LAMP WITH REMOVABLE OIL CONTAINER

BACKGROUND OF THE INVENTION

Non-electric table lamps usually take the form of a decorative candle holder or a hurricane lamp. The lamp of this invention is neither of the above, provides a substantial reservoir of fuel, and can be adjusted as to its height.

SUMMARY OF THE INVENTION

The lamp of this invention is a holder for a soft drink can or beer can from which the contents have been emptied and replaced with lamp oil. A holder for the bottom of the can is fixed atop a wide conical base. A holder for the top of the can has a central opening for a wick, and has downward extending parallel tabs. The holder for the top and the bottom of the can are joined by a vertical handle which has a horizontal projection at the bottom joined to the can bottom holder, and a horizontal projection at the top which may be adjustably attached to the slot between the two parallel tabs. The height of the top may be adjusted by sliding it up or down. The beer or soft drink can which has been filled with lamp oil is inserted between the top and bottom can holders with the wick being inserted into the can through the pop top. The top can holder is then slid down and fastened to the handle. A glass or transparent plastic funnel having the shape of a truncated cone is placed atop the top can holder and overlaps the circular edge thereof.

It is an object of the invention to provide a simple, low-cost, easily assembled table lamp.

It is a further object of this invention to provide a table lamp which can be economically packaged.

It is a further object of this invention to provide a table lamp which can be adjusted in height to accommodate cans of varying lengths.

It is a further object of this invention to provide a promotional device for display of a given brand or trademark of a soft drink or beer.

BRIEF DESCRIPTION OF THE DRAWINGS

FIG. illustrates the fully assembled table lamp.

DETAILED DESCRIPTION OF THE INVENTION

Figure 1:
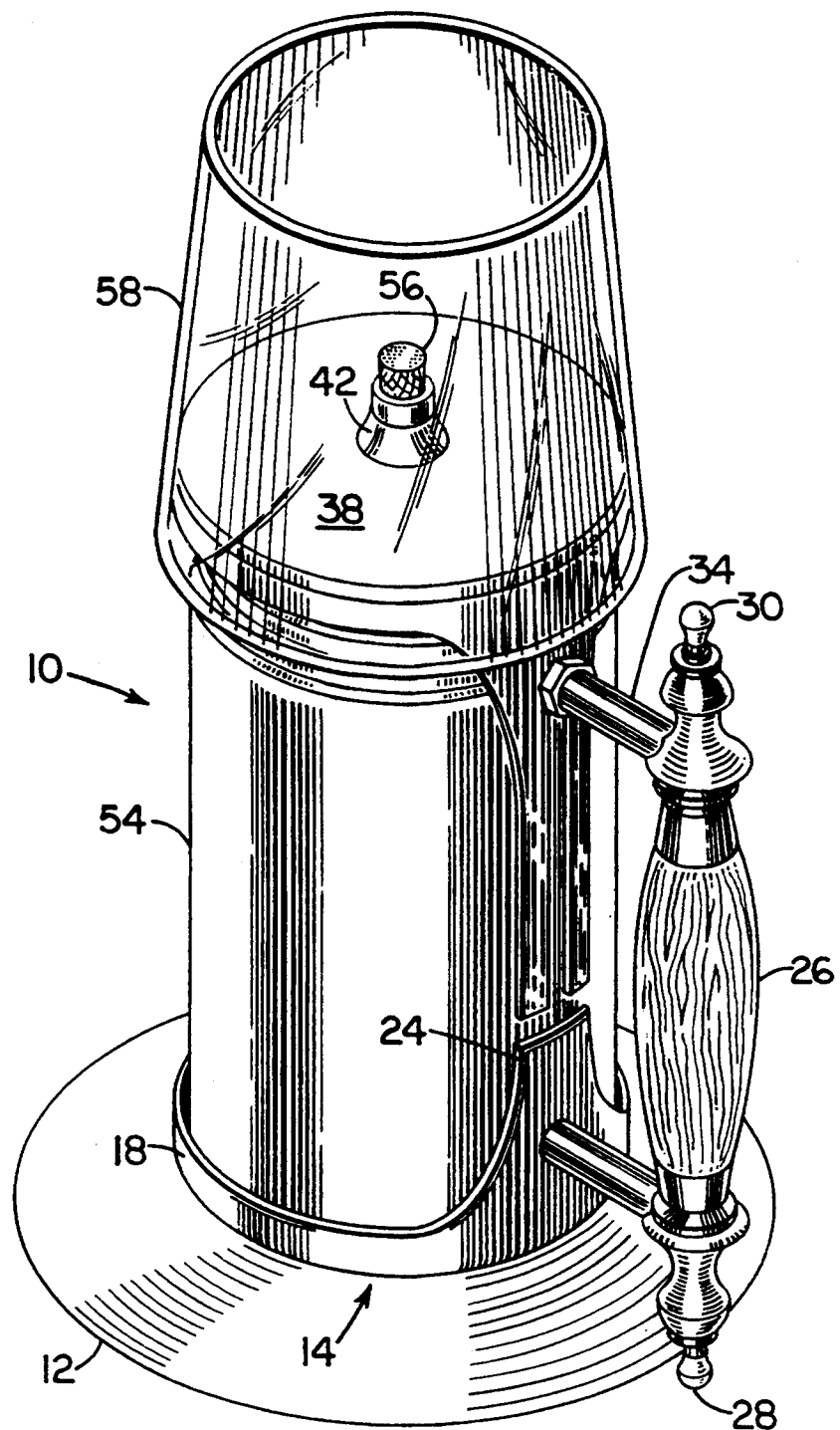
Figure 2:
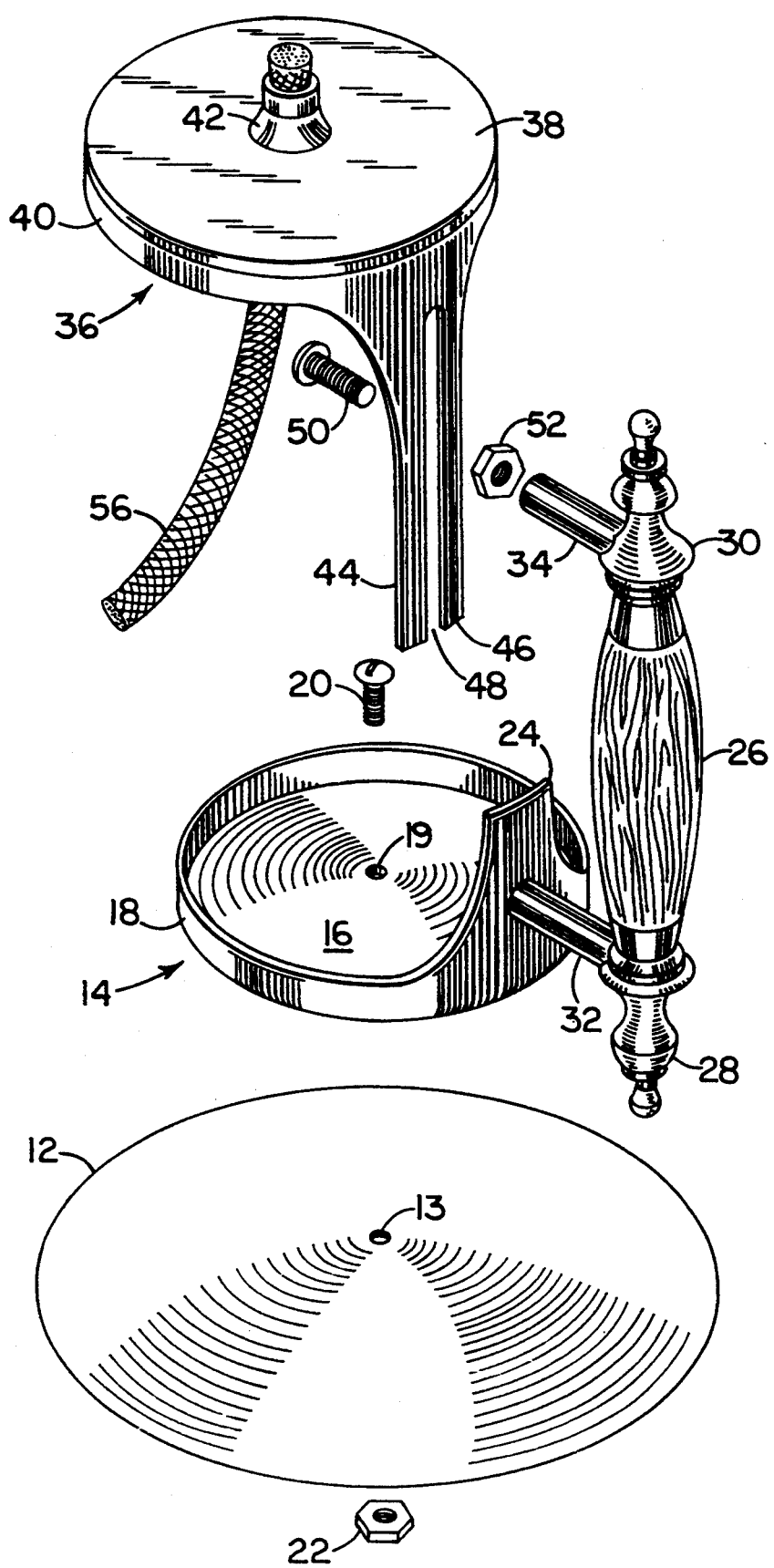
FIG. 2 illustrates the lamp disassembled without the container and without the funnel.
Figure 3:
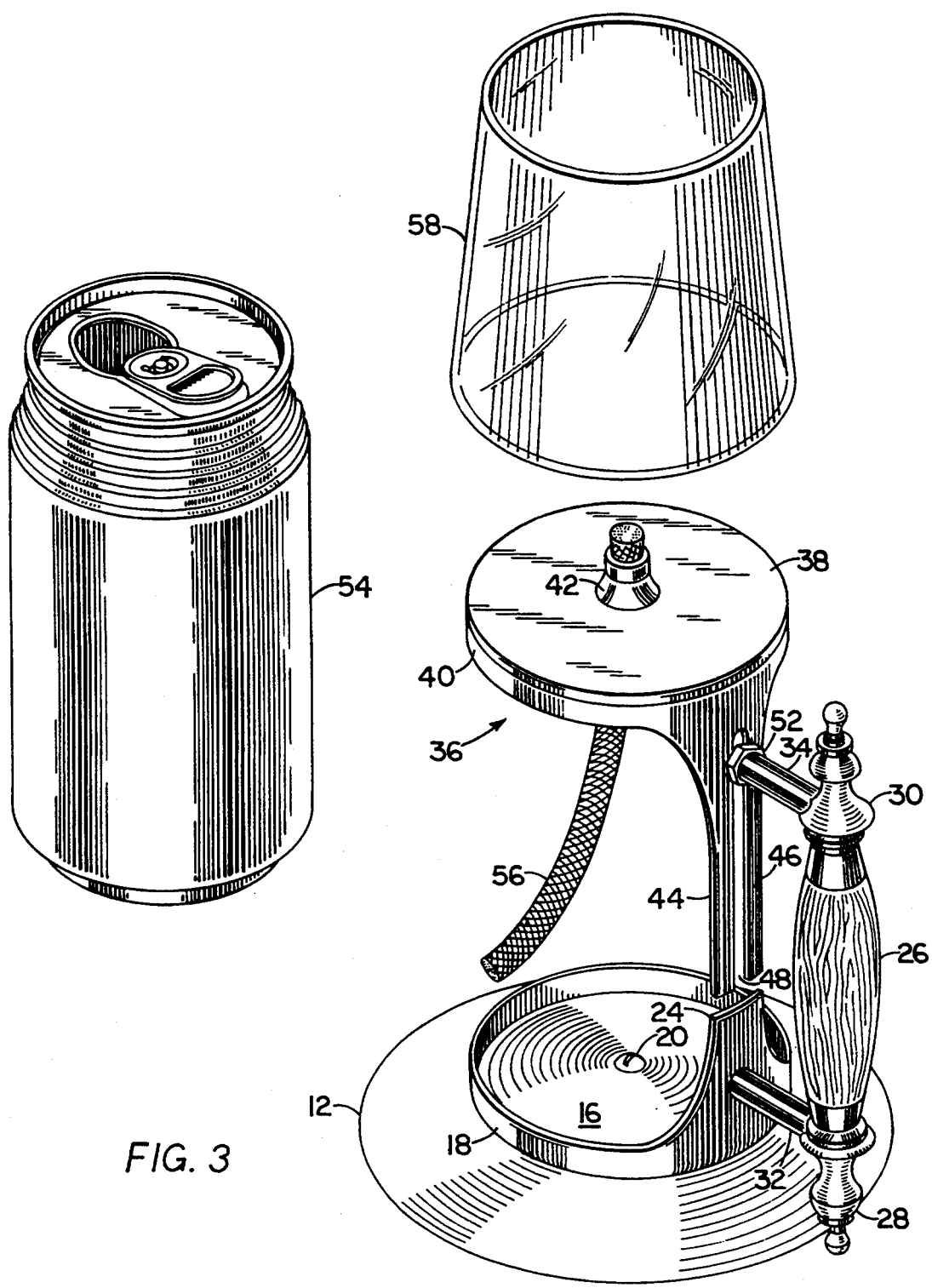
FIG. 3 illustrates the lamp assembled and ready for insertion of the fuel container.

The table lamp is indicated generally as 10. There is a shallow conical base 12 with the top of the cone uppermost. There is a hole 13 in the center of base 12. Bottom can holder 14 comprises a disc 16 surrounded by a circular rim 18 extending upward from the periphery of disc 16. The internal diameter of rim 18 is such as to accommodate the bottom of a soft drink can or a beer can. In the center of disc 16 is a hole 18. Bolt 20 extends through holes 13 and 18 and is fastened by nut 22, thereby securing bottom can holder 14 to conical base 12. A tab 24 extends upward from rim 18.

A wooden handle 26 is oriented vertically. A decorative metal fitting 28 is attached to the bottom of handle 26, and a decorative metal fitting 30 is attached to the top of handle 26. A rod 32 is attached to bottom fitting 28 and extends horizontally to tab 24 to which it is attached. A rod 34 extends horizontally from upper fitting 30. The free end of rod 34 is threaded internally (not shown).

Upper can holder 36 comprises a disc 38 from the periphery of which a rim 40 extends downwardly. The internal diameter of rim 40 is such as to accommodate the top of a soft drink can or a beer can. In the center of disc 38 is a hole (not shown) which is surrounded by wick holder 42. Parallel tabs 44 and 46 extend downward from rim 40. Between tabs 44 and 46 is slot 48.

Container 54 of lamp oil is placed on bottom can holder 14, and upper can holder 36 is lowered to the proper height and container 54 is then removed. Handle 26 is attached to upper can holder 36 by projecting bolt 50 through slot 48, threading nut 52 on to bolt 50 and threading bolt 50 into rod 34. Rod 34 is pulled in against tabs 44 and 46, and nut 52 secures bolt 50, and therefore upper can holder 36, to handle 26. Wick 56 is placed into the container 54, and container 54 is then snapped into place between the upper and lower can holders 14 and 36 respectively. Protective funnel 58 is then placed over the top of the assembly and the lamp 10 is ready for operation.

It can be seen from the above that a table lamp has been invented which can utilize an emptied beer or soft drink can as a removable reservoir for illuminating liquid such as lamp oil. The lamp may be adjusted for reservoirs of differing heights. The can itself may serve as an advertisement.

While this invention is susceptible of embodiment in different forms, the drawings and the specification illustrate the preferred embodiment of the invention, with the understanding that the present disclosure is to be considered an exemplification-of the principles of the invention, and the disclosure is not intended to limit the invention to the particular embodiment described.

I claim:

1. An oil-fueled table lamp comprising:

a conical base;

a lower circular can receiver attached to the conical base;

said circular can receiver having a circular rim extending upwardly from the periphery thereof, and a tab extending upwardly from the rim;

a vertically oriented handle having a rod extending horizontally from the bottom of the handle, said rod being fixed to the handle and to the tab which extends upwardly from the rim;

said handle having an internally threaded rod extending horizontally from the top of the handle, directly above the bottom rod;

an upper circular can receiver, said receiver having a circular rim extending downwardly from the periphery of the upper circular can receiver, said rim having two tabs extending downwardly and parallel to each other, forming a slot therebetween;

said upper circular can receiver having a hole in the approximate center thereof, said hole being surrounded by a wick holder;

a wick slidable within said wick holder;

a bolt threaded into the rod extending from the top of the handle, said bolt having a nut threaded on to it, and extending through the slot between the downwardly extending tabs;

a container having a hole in its top suitable for insertion of the wick, said container being removably insertable between the lower can receiver and the upper can receiver; and a transparent protective funnel in the shape of a truncated cone for placement atop the upper can receiver.

2. The table lamp of claim 1 wherein the container is a beer can whose contents have been replaced with lamp oil.

3. The table lamp of claim 1 wherein the container is a soft drink can whose contents have been replaced with lamp oil.

* * * * *